United States Patent Office 3,770,623
Patented Nov. 6, 1973

3,770,623
SYSTEM FOR PURIFICATION OF POLLUTED WATER
Kathe Seidel, Krefeld-Hulserberg, Germany, assignor to Max-Planck-Gesellschaft zur Forderung der Wissenschaften e.V.
Filed May 1, 1972, Ser. No. 248,994
Claims priority, application Germany, June 15, 1971,
P 21 29 660.6, P 21 29 711.0; Sept. 30, 1971,
P 21 48 996.3; Dec. 20, 1971, P 21 63 283.7
Int. Cl. C02c 1/02
U.S. Cl. 210—2                                38 Claims

ABSTRACT OF THE DISCLOSURE

Method and apparatus for removal of suspended and dissolved pollutants from water by flow of water over and through beds having suitable vegetation rooted and growing therein. Suspended and dissolved material are removed in separate beds using different types of vegetation. Where the pollutant is sewage, potable water can be produced.

BACKGROUND OF THE INVENTION

The removal of pollutants from water has conventionally required large settling beds equipped with extensive apparatus, flocculation equipment, filtration beds and treatment with activated sludge. The equipment required for such treatment is large, expensive and costly to maintain. Moreover, while conventional equipment and processes have been satisfactory for the treatment of water containing sewage, there is as yet no general treatment for water containing the effluent of industrial plants. The treatment of water containing industrial effluent is only now becoming widespread, and is being handled on a case-to-case basis. The removal of certain pollutants from industrial effluents by conventional means has proved to be so expensive that the very existence of a number of industries has been jeopardized. The situation is particularly acute with reference to materials such as the chlorinated phenols, which are malodorous even in small quantity as well as toxic.

It has already been shown that effluents can be purified with the aid of certain useful plants where the pollutants serve as a nutrient for these plants. Similarly, some of these pollutants are eliminated by substances exuded by these plants. These biological processes, however, cannot be used when the effluent to be treated contains large quantities of a wide variety of pollutants.

SUMMARY OF THE INVENTION

Water which may contain immiscible components such as oils or tar, as well as coarse suspended matter, suspended colloidal material as slime dissolved inorganic and organic compounds and/or pathogenic organisms is first fed into a settling tank in which coarse suspended matter settles to the bottom and immiscible liquids, in general lighter than water, float to the top. Provision is made for removing the low-density immiscible components and the sludge from the tank, and the water which now contains only colloidal matter, pathogenic organisms and dissolved materials is passed into one of at least two filtration beds each consisting of a bottom layer of a coarse porous material and a top layer of a fine porous material having rooted and growing therein plants having nodes. A suitable plant is *Phragmites communis*. The water is introduced into a filtration bed above the surface of the porous layers in the bed and the level is maintained thereabove so that the suspended matter and slime will settle on the top of the bed as the water filters therethrough. At least two such beds are provided in parallel so that while one bed is in use, the filtered material in the other bed may dry out, in which process the material shrinks to a thin layer, cracks and curls.

Water leaving the filtration beds contains only dissolved material and pathogenic organisms. This water is then passed through an elimination bed containing a layer of porous material such as sand in which is rooted and growing a suitable plant such as *Scirpus lacustris*. Other plants may be used in one or more subsequent beds for the removal of organic compounds, inorganic ions and bacteria not taken up by *Scirpus lacustris*. The plants used in the final stages, which are designed to remove dissolved matter and pathogenic organisms, are such as can use the remaining pollutants as nutrient.

Accordingly, an object of the present invention is to provide an improved apparatus and method for removing oils, slime, suspended matter, dissolved matter and pathogenic organisms from water.

Another object of the invention is to provide an improved apparatus and method for removing pollutants from water at low cost in apparatus and space.

A further object of the invention is to provide an improved apparatus and method for removing pollutants from water where the pollutants include industrial effluents.

Still another object of the invention is to provide an improved apparatus and method for removing pollutants from water by means of selected vegetation.

Yet another object of the invention is to provide an improved apparatus and method for producing potable and industrially useable water from heavily polluted water.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing, in which.

DESCRIPTION OF THE PREFERRED EMBODIMENTS

Figure 1:
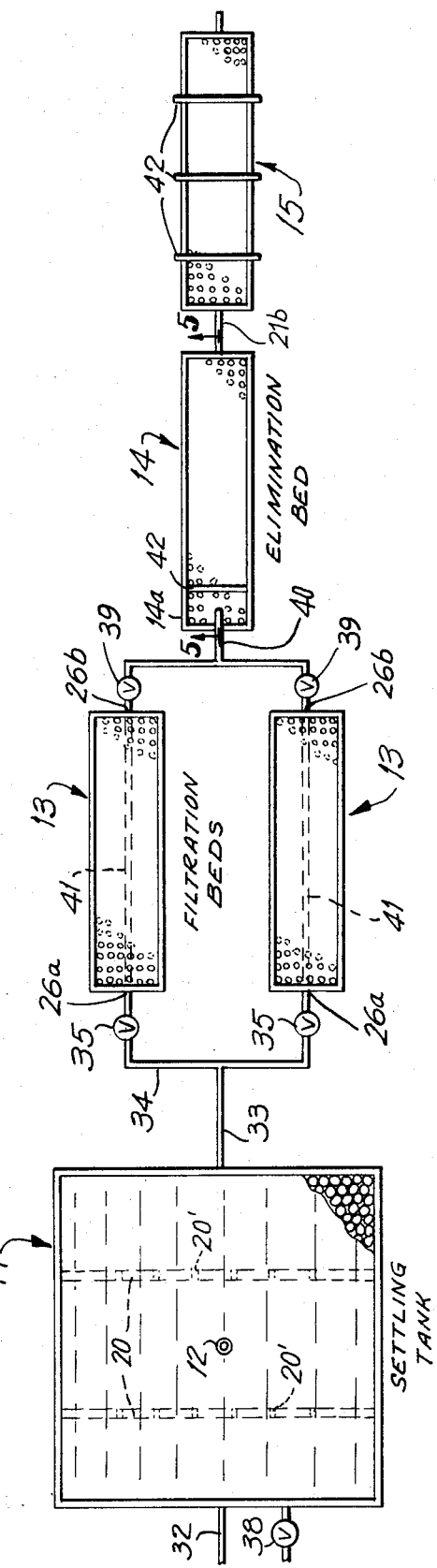
FIG. 1 is a schematic representation of a system for removing pollutants from water in accordance with the present invention.
Figure 4:
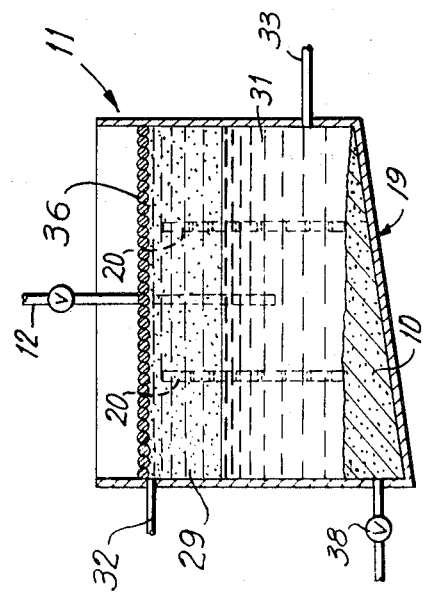
FIG. 4 is a diagrammatic elevational section of a tank for separation of immiscible fluid from water and for separation of coarse sediment.
Figure 5:
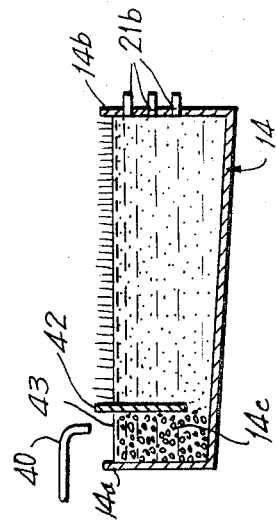
FIG. 5 is a diagrammatic elevational section through bed 14 of FIG. 1.

A system for the removal of a wide variety of pollutants from water is shown schematically in FIG. 1, where the effluent to be purified first enters settling tank 11 through a port 12, this tank constituting the first stage of the purification equipment. Coarse sediment 10 settles to bottom 19 of tank 11, bottom 19 being sloped in opposition to the flow of the water. The sludge which collects is withdrawn periodically through valve 38 before it packs too tightly to flow. Valve 38 preferably has a diameter of at least 2 inches. It has been found that sludge dumped upon reed beds is converted to topsoil or humus. Immiscible liquid 29, which collects on top of water phase 31, overflows continuously through overflow pipe 32.

The effluent as it enters tank 11 through pipe 12 causes a certain amount of turbulence. To aid in the separation of sediment from the suspension and the separation of such immiscible liquids as may be present, two or more barriers 20 are placed in the tank on either side of the entry pipe 12. The barriers extend from below the surface of the liquid to regions near but clear of the bottom of the tank and also extend across the width of the tank from wall to wall. The barriers 20 are apertured so that water can flow therethrough.

The surface of the tank 11 is preferably covered with a low density, opaque material such as hollow plastic balls 36 to prevent access of light thereto and possible consequent growth of algae. Alternatively, tank 11 is roofed over.

Figure 3:
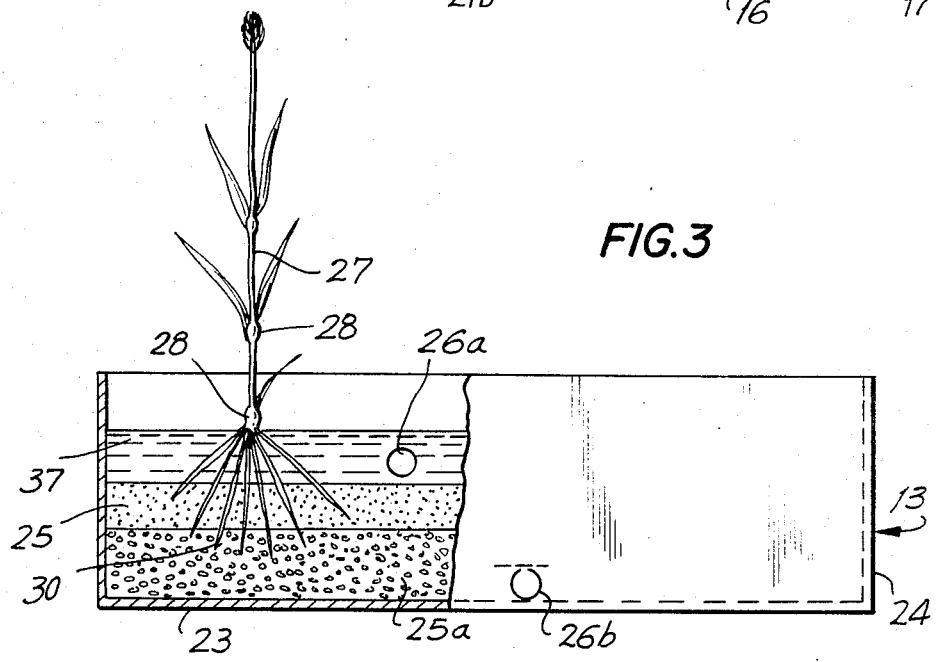
FIG. 3 is a diagrammatic transverse section of a bed for removing slime and suspended colloidal matter.
Figure 6:
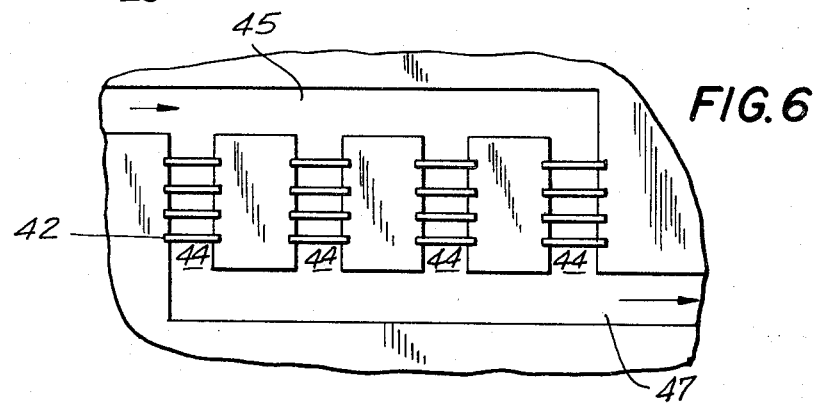
FIG. 6 is a diagrammatic plan view of a flow distribution system.

Water from water phase 31 leaves tank 11 through pipe 33 and pipe 34, passing to one of filtration beds 13 in accordance with the setting of valves 35, these beds constituing the second stage of the purification equipment. Bed 13 (FIG. 3) has a bottom wall 23, and side walls 24 which are impervious to water, a bottom layer 25a of coarse material such as gravel, and a top layer 25b of fine sand. Entrance port 26a is above the surface of sand layer 25b. Exit port 26b takes water from the gravel layer so that all water which passes through filtration beds 13 is filtered consecutively through sand layer 25b and gravel layer 25a. Preferably, exit port 26b is connected to drainage means 41 such as a perforated tube or trough lying on the bottom of bed 13 along the entire length of the bed. The upper portion of the tube or trough 41 is open and covered with a mesh to allow filtered water to enter the tube or trough while preventing entry of coarse material. The rate of flow of water through filtration bed 13 as well as subsequent beds depend on the pitch of the bed, which is generally between about 2 and 6% and furthermore can be controlled by means of valves 35. It is to be understood that the term "valves" includes sluice gates and the like.

In order for filtration to occur, the level of the water in which ever of the filtration beds 13 is in use must be maintained above the level of the sand layer 25b.

A plant having a strong system of shoots is required so that the rate of evaporation of water may be relatively high. The stalks must have nodes 28 thereon so that when the level of filtered-out slime or colloidal material reaches them, new roots will be generated from the nodes into slime. These roots hold the filtration layers open for flow of water therethrough. Especially preferred for this purpose is the common reed *Phragmites communis*. However, other plants having similar characteristics may be used; examples are bamboo, the giant reed *Arundo donax* and *Polygonum*. The roots 30 of plants 27 grow into the porous layers 25a and 25b, forming a matrix which filters out the slime and suspended colloidal matter effectively.

The number and size of parallel filtration beds will depend upon the rate of flow of polluted water and on the amount of slime which must be filtered out. As aforenoted, the minimum number of filtration beds is two, so that the deposited material on one bed may be drying while the other bed is functioning as a filter. The drying process must be carried out to the point where the filtrate cracks, contracts and curls before the bed is returned to use. Otherwise the continuous layer of slime would impede filtration.

The bottom layer 25a of filtration bed 13 may consist of coarse gravel with a grain size of from 1 to 5 cm., and preferably 1.5 to 3 cm. Good results are obtained with a top layer 25b of sand with a grain size of 1 to 5 mm., and preferably 2 to 3 mm. The grain sizes selected will depend upon the characteristics of the suspended matter to be removed. The thickness of the individual layers must be such as to make certain that all suspended matter and slime are removed. Depending upon the amount of matter to be removed, top layer 25b should lie between 5 and 25 cm. in thickness and bottom layer 25a between 20 and 50 cm. in thickness.

Exit pipes 26b drain the water from filtration beds 13 through valves 39 and pipe 40 to elimination bed 14. It should be noted that the term "pipe" as used herein includes sluices, channels, trenches, troughs and the like.

In general, beds 13, 14 and any subsequent beds will be in the form of trenches dug in the soil. The bottoms of the beds 13 as well as of tank 11 must be impermeable, since otherwise polluted water would enter the soil. Walls 23 and 24 of bed 13 may themselves be constructed to be impermeable or may be lined. Bed 14 and subsequent beds such as bed 15, if present, may have permeable bottoms if the degree of purification reached is such that the quantity of pollutants introduced into the soil is not excessive. Moreover, some purification is afforded by passage of water through soil, and the quantity of ground water is thereby augmented.

Figure 2:
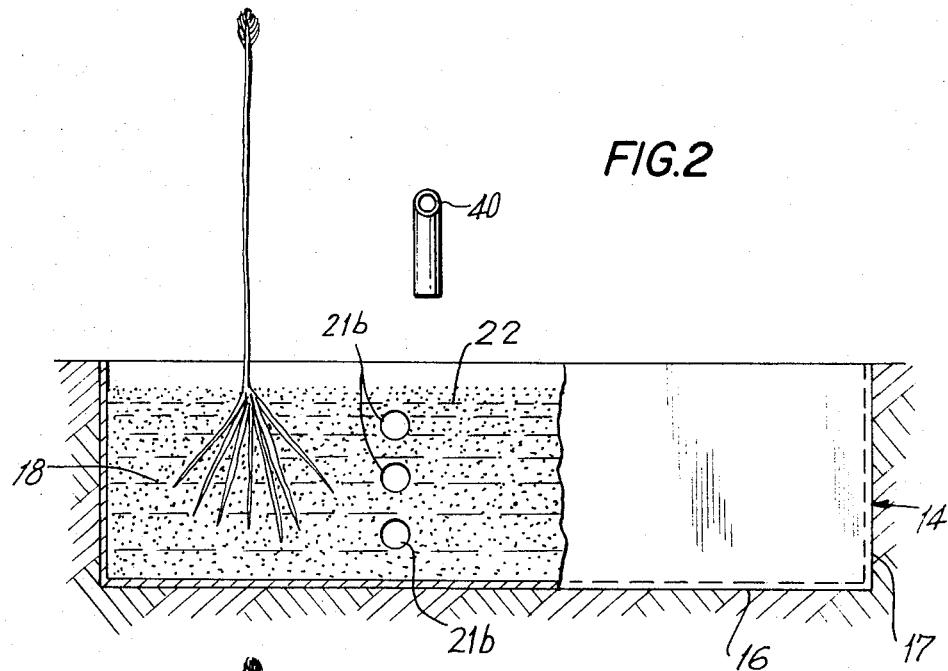
FIG. 2 is a diagrammatic transverse section of a bed for the removal of dissolved pollutants.

Elimination bed 14 is the third stage of the equipment and serves to remove dissolved pollutants and pathogenic organisms from the water flowing therethrough. The construction of the bed is shown in FIG. 2. Bed 14 comprises a bottom 16 and vertical side walls 17. In bed 14 is a layer 18 of porous material such as sand or glass fibers. Water is introduced into the bed 14 through pipe 40. Water flowing from bed 13 to bed 14 is exposed to contact with air to absorb oxygen. Bed 14 at its upstream end 14a has a catch basin 43 containng gravel and is separated from the remainder 14b of the bed by a baffle plate 42 under which the effluent flows to reach that part 14b of bed 14 containing plants 27 in porous material 18. Exit ports 21b are likewise located below the top surface of the layer 18. Rooted and growing in the porous material are plants selected for removal of the particular dissolved pollutants known to be present. Preferred plants for this purpose are *Scirpus lacustris* and *Typha angustifolia*. These plants have been found to be effective for the removal of organic aromatic compounds and pathogenic organisms, including *E. coli*, salmonella, acid-fast bacteria, ascarides and oxyuris. They are also effective for the removal of the anions, phosphates, nitrates, sulphates and chlorides.

Where organic compounds including halogenated phenols such as pentachlorphenol are present, the root system of tall-growing bulrushes is particularly effective. The species when mature should be at least 10 cm. high and species which have air-filled stalks are preferred. Especially good results are obtained with *Juncus effusus, Juncus maritimus, Scirpus maritimus, Scirpus lacustris* and/or *Scirpus tabernaemontani*.

It is possible to use more than one elimination bed, the beds being in series and each bed containing only one type of plant which may differ from those in other beds.

Plants which are particularly suitable for the removal of biological materials such as pathogenic organisms are *Acorus calamus, Scirpus lacustris, Carex stricta, Iris pseudacarus, Typha* varieties, *Glyceria aquatica, Phragmites communis, Myosotis palustris, Mentha aquatica* and *Juncus* varieties such as maritimus and effusus.

A number of factors should be considered in selecting plants to be installed in the various beds. Factors, as would be expected, are the degree of pollution, the nature of the pollutants, and the quantity of water which must be treated per unit of time. In designing the beds, it is necessary to provide for a specified maximum throughput rate by choice of bed length, depth and width, as well as the porosity of the porous material and the slope of the bed. These factors are too well known to require further detailing and can readily be determined by one skilled in the art. It has been found experimentally that vertical sides are preferable and widths up to 2 meters are convenient, the maximum width being limited by accessibility to workmen tending the plants. Elimination beds as long as 100 meters have been found useful. Where the elimination bed has an impermeable bottom, the depth of sand or other porous material in the bed preferably lies between 50 and 100 cm.

Where the climate is particularly severe, the filtration and/or the elimination beds may be protected against cold weather by the use of hothouselike structure; these may be of plastic sheet.

The construction and operation of the system has been described in what is essentially basic form. A number of variations are feasible, these variations contributing both to the efficiency of the operation and to the quality of the output water. As an example, where the effluent from a manufacturing plant is too heavily polluted, it may be diluted with water from a purer source before passing through the system. Another mode of operation which has been found to be effective is to pass heavily polluted water through the system for three to four hours and then to pass unpolluted water through the system for approximately sixteen hours. The ratio of polluted water to unpolluted water in either method should be between 1:3 and 1:6. Where salt or other materials deposit on the stalks of plants, unpolluted water must be run past the plant until the deposit is removed. Also, where the source of pollutants operates only intermittently unpolluted water should be supplied to the system to keep the plants moist at such times when there is no effluent.

In some cases, it may be desirable to be able to adjust the level of the liquid in the elimination beds 14, 15, etc. These beds must be operated in such a way that the liquid level never rises above the surface of the bed itself, since such water will not come in contact with the root system, which is the effective part of the plant in carrying out the purification process. For this reason, two or more exit pipes 21b may be installed at the exit end of each of the elimination beds. Such exit pipes are placed at different levels as a means of establishing the depth of water in the associated bed. As is obvious, in order to avoid the necessity for pumps or other such devices, each of the beds should lie at a lower level than the bed preceding.

Where the water is particularly havily loaded with pathogens, at least one of the elimination beds is planted with vegetation having certain bacterial nodules on the roots thereof, preferably varieties of Alnus. This procedure is based on the knowledge that plants with bacterial nodules kill pathogenic organisms such as *Echerichia coli*, Enterococci, salmonellae, etc. The effectiveness of such plants has been attributed to the fact that the root nodules of these plants are nitrogen collectors. Presumably, one or more substances are formed within the nodules where the substances are antibiotic in effect. The plant itself can then release this substance or these substances into the water, as a result of which the pathogenic organisms are killed. The substance or substances released may be related to streptomycin. Among the Alnus varieties, *Alnus glutinosa* is preferred. Another example is *Robinia pseudacacia*.

The width of the beds in which *Alnus glutinosa* is planted should be such that the hedgelike plants can be well controlled and the falling leaves can be easily removed in the fall. The length of time that the water must remain in the bed depends on the content of pathogenic organisms and can be regulated by simple methods. For example, planks 42 (FIG. 1) can be turned on edge and placed in the beds transversely, so that part of the plank is above the level of the water and part below.

Especially good results are obtained when *Alnus glutinosa* is used in combination with other plants, particularly *Mentha aquatica* (water mint) and *Iris pseudacarus*. Good results are also obtained by the use of *Alisma plantago, Juncus effusus, Scirpus lacustris* and *Phragmites communis*. The sequence of the plants should be such that the polluted water must first come into contact with *Alnus glutinosa* and thereafter with such other plants as may be used in combination therewith. A convenient arrangement for using the plants in sequence is to feed several parallel trenches 44 from a distribution ditch 45, the trenches being planted with *Alnus glutinosa* and to place a collecting ditch 47 downstream into which all of the parallel trenches empty. The collecting ditch 47 should then be planted with *Mentha aquatica* alone or in sequence with *Iris pseudacarus*. *Iris pseudacarus* is particularly valuable because of the fact that it is effective all year around, so that effective removal of organisms occurs even in the wintertime.

Where high concentrations of salmonella are present, the combination of *Alnus plutinosa* with *Alisma plantago* is preferred, since the latter plant thereby gains in effectiveness to the point where it is equivalent to *Mentha aquatica*. Following is an example of the effectiveness of such plants in removing pathogenic organisms from polluted effluent:

Four shallow parallel trenches having a width of about 1 meter and a length of 30 meters were connected at the inflow end with the distribution ditch and at the outflow end with the connection ditch. *Alnus glutinosa* were arranged in a hedgelike pattern in the four parallel trenches. The collection ditch was planted with *Mentha aquatica* and *Iris pseudacarus*. Each of the parallel trenches was fitted with four planks 42 on edge, as described above, spaced at equal intervals from each other. Table 1 gives the bacterial content per milliliter of feed water in different seasons.

TABLE 1

| E. coli | Enterococci | Salmonllae |
|---|---|---|
| Winter about 2,000 | 50–1,1000 | 350–500 |
| Summer about 35,000 | 560–15,000 | 5,000 |

The effectiveness of the trench system described on water having the bacterial content given in Table 1 is shown in Table 2, where the figures under each heading give the number of germs per milliliter at the entrance and exit ends of the collection ditch.

TABLE 2

| Date | Temp. air in °C. | Temp. water in °C. | E. coli | Enterococci | Salmonellae | |
|---|---|---|---|---|---|---|
| 1/19 | +4 | −3 | 30 | 25 | 30 | I |
|  |  |  | 7 | 6 | 10 | O |
| 6/29 | 12.5 | 16.2 | 720 | 50 | 0 | I |
|  |  |  | 7 | 20 | 0 | O |
| 7/15 | 15.0 | 8.0 | 100 | 35 | 6 | I |
|  |  |  | 80 | 6 | 0 | O |
| 7/23 | 17.0 | 14.5 | 350 | 56 | 5 | I |
|  |  |  | 30 | 0 | 0 | O |
| 9/30 | 22.0 | 13.0 | 700 | ---- | 500 | I |
|  |  |  | 15 | ---- | 3 | O |
| 9/9 | 26.0 | 15.0 | 3,000 | ---- | 150 | I |
|  |  |  | 15 | ---- | 0 | O |
| 12/1 | 8.0 | 9.0 | 22 | 50 | 50 | I |
|  |  |  | 1 | 6 | 1 | O |

Note.—I=Inflow; O=Outflow.

The length of the installation was 4 meters. With a longer installation, the number of pathogenic organisms can be reduced to zero even during the wintertime. Aeration of the elimination beds from the bottoms thereof has been found effective in bringing about flocculation of any colloidal matter present.

The size of a system required for removing all types of pollutants as well as pathogenic organisms will, of course, depend on the quantity of water to be treated, and the type and quantity of pollutants present. In addition, the size of the system will depend on the climate in which it is to be operated, since the rate of removal of pollutant is a function of the temperature. Assuming a temperature climate, such as that of Berlin, Germany, and a municipal sewage concentration of 5%, it has been found that one square foot of planted area can purify 27 gallons of such water in a twenty-four-hour day. In reckoning the planted area, the areas of all planted beds in operation at one time are totalled.

A preferred spacing of plants is on one-foot centers in a square array; this amounts to one square foot per plant. The actual spacing will, of course, depend on the nature of the plant.

The process of removal of organic pollutants by bed 14 and subsequent beds, trenches and ditches involves the metabolizing of these compounds by the vegetation. As a result, the plants grow luxuriously under such circumstances and it is necessary that the beds be harvested more than once a year. The rate of growth, of course, is smaller during the winter than during the summer, and this has been taken into account in specifying the size of the beds necessary for adequate removal of pollutants.

As the suspended matter settles out in beds 13, the level of the bed surfaces will rise until they begin to approach the height of the side walls. As this process goes on, new roots sprout from the nodes of the plants therein, so that the beds retain their effectiveness. It then becomes necessary to build up the side walls.

A plant such as mint, which can impart a pleasant flavor to the effluent water, may be incorporated in bed 14 and/or 15.

In summary, it has been shown that properly selected vegetation can be used for the removal of organic and inorganic pollutants as well as pathogens from water to an extent such that the water becomes potable; this has been found to be the case even when the water is polluted with such strongly distasteful and aromatic materials as phenolic compounds. Also, vegetation having nodes is effective in the removal of slime and colloidal matter from polluted water. Since no heavy equipment or moving parts are involved, costs of purifying water by means of vegetation are low. By choice of the vegetation to be used, the system is applicable to a wide variety of locations in different climates. Furthermore, both sewage and industrial effluents can be purified.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A system for purification of heavily polluted waste water containing oily pollutants, coarse suspended material, slime, colloidal material, dissolved inorganic and organic compounds and/or pathogenic organisms, comprising a first-stage container for separation from said water of said coarse suspended material by sedimentation and of said oily pollutants which float to the surface of said water, second-stage filtration beds numbering at least two for removing slime and colloidal material, each of said second-stage beds containing a fine layer of sand and plants growing therein, said plants having nodes from which roots can grow as the level of slime and other colloidal matter filtered out from said waste water by said sand rises, piping and valving means connecting said first-stage container and said second-stage beds so that one of said second-stage beds may be taken out of service while slime previously deposited upon said layer of sand dries and fractures, at least one third-stage elimination bed containing a layer of porous material and having a plant growing therein which can utilize dissolved material in said waste water as nutrient, and piping and valving means for introducing waste water into said first-stage container, removing sludge from said first-stage container, removing oily pullutants from the surface of said first-stage container, transferring water from said second-stage beds to said third-stage bed and for removal of purified water from said third-stage bed.

2. The system of claim 1, wherein the bottom of said first-stage container slopes upward in the direction of flow of liquid through said container to facilitate removal of sludge through one of said valves positioned proximate the lower end of said sloping bottom of said container.

3. The system of claim 1, wherein said first-stage container contains apertured partitions at right angles to the flow of liquid through said container, said partitions making contact with both side walls and approaching but not reaching the surface, or the bottom of said first-stage container, said partitions serving to minimize turbulence which would otherwise interfere with the separation of said oily pollutants and said sediment.

4. The system of claim 1, wherein the surface of the liquid in said first-stage container is covered with a layer of a low density, opaque material to prevent access of light to the surface of the liquid, thereby preventing the growth of algae.

5. A system as defined in claim 1, wherein said filtration beds contain a lower layer of gravel between 20 and 50 cm. thick, with a grain size of 1 to 5 cm. and an upper layer of sand between 5 and 25 cm. thick, with a grain size of 1 to 5 mm.

6. A system as defined in claim 1, wherein said filtration beds have a lower layer of gravel having a grain size of 1.5 to 3 cm. and an upper layer of sand with a grain size of 2 to 3 mm.

7. A system as defined in claim 1, wherein said elimination bed has an outlet end and a plurality of outlets at different levels at said outlet end, all of said outlets lying below the top surface of said porous material in said bed, said outlets being fitted with control means whereby the level of water in said bed may be controlled and the rate of flow therethrough may be regulated.

8. A system as defined in claim 1, wherein said waste water flows through a plurality of elimination beds wherein are planted a plurality of different plants.

9. A system as defined in claim 1, wherein said plants in said filtration beds are selected from the group consisting of *Phragmites communis*, bamboo, *Arundo donax*, and *Polygonum*.

10. A system as defined in claim 1, further comprising a baffle plate in said elimination bed, said baffle plate dividing said elimination bed into two sections, the first of said sections being an entrance chamber for the reception of effluent from said filtration bed and containing coarse gravel and the second of said sections containing said layer of porous material having a plant growing therein, said baffle plate extending from above the level of said porous material to a point above the bottom of said elimination bed so that said effluent can flow from said entrance chamber underneath said baffle plate into the second of said sections, and an exit port in the second of said sections below the surface of said elimination bed, said plant being effective for removal of dissolved pollutant from said water rooted and growing in said layer, and being selected from the group consisting of *Scirpus lacustris, Scirpus maritimus, Scirpus tabernaemonti, Typha angustifolia, Juncus maritimus, Juncus effusus, Alnus glutinosa, Mentha aqatica, Iris pseudacarus, Alisma plantago,* Acacia, *Phragmites communis, Acorus calamus, Carex stricta,* Typha varieties, *Glyceria aquatica,* and *Myosotis palustris.*

11. A system as defined in claim 1, wherein said elimination bed comprises a plurality of shallow parallel trenches having a width of about 1 meter and a length of about 30 meters, said trenches having inflow ends and outflow ends, a distribution ditch at said inflow end for receiving waste water from said filtration beds and a collection ditch for receiving effluent from said plurality of parallel trenches, said parallel trenches being planted with *Alnus glutinosa* and said collection ditches being planted on both sides with *Mentha aquatica* and *Iris pseudacarus*, said arrangement of a plurality of parallel trenches with the associated distribution ditch and collection ditch being particularly suitable for the removal of pathogenic organisms.

12. A system as defined in claim 1, wherein said elimination bed has growing therein tall bulrushes having air-filled stalks, suitable plants for this purpose being *Juncus effusus*, *Juncus maritimus*, *Scirpus lacustris* and *Scirpus tabernaemontani*, such plants being particularly suitable for the removal of chlorinated phenols.

13. A system as defined in claim 1, wherein the walls and bottoms of at least said container and said filtration beds are impermeable to said waste water and said contents thereof.

14. A system as defined in claim 1, wherein the walls and bottom of at least one of said third-stage beds are permeable to water and compounds dissolved therein, such a bed being suitable for water free of industrial pollutants.

15. A system as defined in claim 1, wherein in the total area of beds being used at any one time at least about a square foot of planted area is provided for each 27 gallons of waste water containing about 5% sewage flowing therethrough per day, the planted area for water containing other concentrations of sewage being roughly proportional to the sewage concentration.

16. A system as defined in claim 15, wherein plants in said beds are disposed at an area density of about one plant per square foot.

17. A process for purification of heavily polluted waste water, containing suspended solid material, oily pollutants, slime, colloidal material, dissolved inorganic and organic compounds and pathogenic organisms, comprising the steps of introducing said polluted water into a first-stage container in which coarse sediment settles out and can be drawn off and in which oily pollutants float to the surface of the water and can be drawn off and from which waste water free of coarse sediment and oily pollutants is transferred to one of a plurality of filtration beds containing a layer of fine granular material in which is growing a plant having nodes therein, settling and filtration of said slime and colloidal material being carried out in one of said plurality of filtration beds while at least one parallel filtration bed is undergoing a drying process in which the filtered layer of slime and colloidal matter dries, cracks and curls, the flow of waste water through said filtration bed being so arranged that the water enters said filtration bed at a level above said layer of fine granular material and leaves below the surface of said layer of fine granular material, transferring said water to a third-stage elimination bed containing a layer of porous material in which is growing a plant capable of using material dissolved in said waste water and pathogenic organisms therein as nutrient and removing water from said elimination bed, said water being removed from said bed being free of oily pollutants, sediment, slime, colloidal matter, and having a lower content of dissolved inorganic and organic materials and pathogenic organisms than present in the waste water entering the first-stage container.

18. The process as defined in claim 17, wherein the bottom of said first-stage container slopes upward in the direction of flow of said waste water to facilitate collection and removal of sludge in the settling of sediment to the bottom.

19. The process as defined in claim 17, wherein apertured partitions are positioned in said first-stage container, the dimensions of said partitions being such that they reach almost to the surface of the liquid in said container and almost to the bottom of said container and from one side to the opposite side, the purpose of said partitions being to decrease turbulence in said container and to thereby facilitate sedimentation.

20. The process as defined in claim 17, wherein said first-stage container has floating on the surface thereof a layer of low-density opaque material to prevent light from reaching the contents of said container, thereby preventing the growth of algae.

21. The process as defined in claim 17, wherein said filtration beds contain a lower layer of gravel between 20 and 50 cm. thick, with a grain size of 1 to 5 cm., and an upper layer of sand between 5 and 25 cm. thick, with a grain size of 1 to 5 mm.

22. The process as defined in claim 17, wherein said filtration beds have a lower layer of gravel having a grain size of 1.5 to 3 cm. and an upper layer of gravel with a grain size of 2 to 3 mm..

23. The process as defined in claim 17, wherein said eliminination bed has a plurality of outlets at different levels, all below the upper surface of said porous material as a means of controlling the depth of water in said bed.

24. The process as defined in claim 17, wherein said waste water flows through a plurality of elimination beds wherein are planted a plurality of different plants.

25. The process as defined in claim 17, wherein at least one plant selected from the group consisting of *Phragmites communis*, bamboo, *Arundo donax* and Polygonum is growing in said filtration beds.

26. The process as defined in claim 17, wherein said plants growing in said elimination beds include at least one of *Scirpus lacustris*, *Scirpus maritimus*, *Scirpus lacustris*, *Scirpus tabernaemonti*, *Typha angustifolia*, *Juncus maritimus*, *Juncus effusus*, *Alnus glutinosa*, *Mentha aquatica*, *Iris pseudacarus*, *Alisma plantago*, *Robina pseudocacia* and *Phragmites communis*, *Acarus*, *calamus*, *Carex stricta*, *Typha* varieties, Glyceria *aquatica*, and *Myosotis palustris*.

27. The process as defined in claim 17, wherein said elimination bed comprises a plurality of parallel trenches having inflow ends and outflow ends, a distribution trench connecting said parallel trenches at said inflow ends to said filtration beds and a collection ditch connecting said parallel trenches at said outflow ends for receiving the outflow of said parallel ditches, said arrangement of parallel trenches, distribution ditch and collection ditch being particularly suitable for the removal of pathogens.

28. The process as defined in claim 17, wherein the plants in said elimination beds include *Juncus effusus*, *Juncus maritimus*, *Scirpus maritimus*, *Scirpus lacustris* and *Scirpus tabernae montani*, said plants being particularly suitable for the removal of chlorinated phenols from waste water.

29. The process as defined in claim 17, wherein the walls and bottoms of at least said container and said filtration beds are impermeable to said waste water and the pollutants therein.

30. The process as defined in claim 17, wherein at least the bottom of said third-stage bed is permeable.

31. The process as defined in claim 17, wherein in the total area of beds being used at any one time at least about one square foot of planted area is provided for a flow of 27 gallons per day of waste water containing 5% sewage, the area provided being roughly proportional to the sewage content of said waste water.

32. The process as defined in claim 17, wherein the area density of said plants is approximately one plant per square foot.

33. The process as defined in claim 17, wherein the flow of waste water through the system is periodically interrupted and unpolluted water is then passed through the system for a period of time long enough for the removal of any deposits which may form in the system.

34. The process as defined in claim 33, in which the periods of flow of polluted and unpolluted water and the relative rates of flow are adjusted so that the ratio of polluted to unpolluted water put through the system is between 1:3 and 1:6 by volume.

35. The process as defined in claim 33, wherein the flow of polluted water is intermittent and unpolluted water is supplied to said beds in the intervals between the flow of said polluted water to keep said plants moist.

36. The process as defined in claim 17, wherein unpolluted water is mixed with polluted water entering the system, whereby poisoning of the plants in the system is avoided when the concentration of pollutants is unusually high.

37. The process as defined in claim 17, wherein pentachlorphenol is the principal contaminant in said polluted water and the waste water entering the system is diluted with unpolluted water to bring the concentration of pentachlorphenol within the range of 1 to 8 mg./l.

38. The process as defined in claim 17, wherein said elimination bed is aerated from below.

References Cited

UNITED STATES PATENTS

| | | | |
|---|---|---|---|
| 681,884 | 9/1901 | Monjeau | 210—17 |
| 2,222,310 | 11/1940 | Emery | 210—2 X |
| 2,442,432 | 6/1948 | Prager | 210—17 |
| 3,728,284 | 4/1973 | Carothers | 210—11 X |

FOREIGN PATENTS

| | | | |
|---|---|---|---|
| 387,126 | 2/1933 | Great Britain | 210—170 |

MICHAEL ROGERS, Primary Examiner

U.S. Cl. X.R.

210—11, 13, 17, 151, 170, 253